(12) United States Patent
Stadler et al.

(10) Patent No.: US 11,816,540 B2
(45) Date of Patent: Nov. 14, 2023

(54) ARTIFICIAL INTELLIGENCE MICROGRID AND DISTRIBUTED ENERGY RESOURCES PLANNING PLATFORM

(71) Applicant: Xendee Corporation, San Diego, CA (US)

(72) Inventors: Michael Stadler, Poway, CA (US); Adib Nasle, Poway, CA (US); Scott K. Mitchell, San Diego, CA (US)

(73) Assignee: Xendee Corporation, San Diego, CA (US)

( * ) Notice: Subject to any disclaimer, the term of this patent is extended or adjusted under 35 U.S.C. 154(b) by 1252 days.

(21) Appl. No.: 16/182,495

(22) Filed: Nov. 6, 2018

(65) Prior Publication Data

US 2019/0311286 A1 Oct. 10, 2019

Related U.S. Application Data

(60) Provisional application No. 62/582,064, filed on Nov. 6, 2017.

(51) Int. Cl.
*G06N 20/00* (2019.01)
*G06Q 50/06* (2012.01)
*G06N 3/08* (2023.01)

(52) U.S. Cl.
CPC ............... *G06N 20/00* (2019.01); *G06N 3/08* (2013.01); *G06Q 50/06* (2013.01)

(58) Field of Classification Search
CPC ........... G06N 20/00; G06N 3/08; G06Q 50/06
See application file for complete search history.

(56) References Cited

U.S. PATENT DOCUMENTS

2015/0057821 A1* 2/2015 Nasle ..................... G06Q 10/04
700/291

* cited by examiner

*Primary Examiner* — Robert G Bachner
(74) *Attorney, Agent, or Firm* — Fish & Richardson P.C.

(57) ABSTRACT

The embodiments disclosed in this document are directed to an AI-enabled microgrid and DER planning platform that uses AI methods and takes into account cost calculations, emission calculations, technology investments and operation. In an embodiment, the computing platform is deployed on a network (cloud computing platform) that can be accessed by a variety of stakeholders (e.g., investors, technology vendors, energy providers, regulatory authorities). In an embodiment, the planning platform implements machine learning (e.g., neural networks) to estimate various planning parameters, where the neural networks are trained on observed data from real-world microgrid/minigrid and DER projects.

20 Claims, 6 Drawing Sheets

| Summary Data | | |
|---|---|---|
| Location | SF | |
| Building Age | <1980 | |
| Building Type | WAREHOUSE | |
| Latitude | 37.62 | |
| Longitude | -122.38 | |
| Tariff Data | | |
| TOU Tariff | 1 | |
| Seasonal Tariff | 1 | |
| Demand Charges | 1 | |
| Absolute Peak (kW) | 843.9106839 | |
| Max Summer TOU Rate | 0.1723 | |
| Max Summer TOU Rate Spread | 0.07218 | |
| Max Summer Noncoincident Rate | 12.92 | |
| Max Summer Demand Rate Spread | 0 | |
| Max Winter TOU Rate | 0.11364 | |
| Max Winter TOU Rate Spread | 0.01458 | |
| Max Winter Noncoincident Rate | 9.23 | |
| Max Winter Demand Rate Spread | 0 | |
| Monthly Utility Meter Fee | 137.9877 | |
| Technology Variable Costs | | |
| Electric Storage | 675 | |
| PV | 3750 | |

| Month | Total Electricity-Only (Week and Weekend) | Total Cooling (Week and Weekend) | Total Electricity and Cooling (Week and Weekend) | Peak Electricity-Only Week Ratio | Peak Electricity-Only Weekend Ratio |
|---|---|---|---|---|---|
| January | 9370.09867 | 0 | 9370.09867 | 2.00456693 | 1.635324767 |
| February | 9282.307911 | 0 | 9282.307911 | 2.087694879 | 1.657471139 |
| March | 9613.980639 | 0 | 9613.980639 | 2.089636638 | 1.639968717 |
| April | 9384.50754 | 0 | 9384.50754 | 2.121000729 | 1.717282965 |
| May | 8777.747639 | 0 | 8777.747639 | 2.155785953 | 1.788941683 |

FIG. 3

| Data Point | Value | | | |
|---|---|---|---|---|
| Total Annual Energy Costs (Including annualized capital costs and electricity sales) ($) | 313500 | | | |
| Total Annual CO2 emissions (kg) | 813798 | | | |
| Total Electric Costs | 200035.95 | | | |
| Total ELECTRICITY Costs ($) | 137448.84 | | | |
| Total annual electricity purchase (KWh) | 1167786 | | | |
| Technology | Existing Capacity | New Capacity | Total Capacity | Size of PV/Solar-Thermal (m^2) |
| Photovoltaic (Kw), peak power under test conditions | 0 | 514 | 514 | 3434 |
| Stationary Battery Capacity (KWh) | 0 | 0 | 0 | |
| Month | TOU ELECTRICITY costs ($) | Electricity Purchase (KWh) | | |
| January | 13563.18 | 124078.27 | | |
| February | 10812.97 | 98885.42 | | |
| March | 11339.71 | 104422.07 | | |
| April | 10359.3 | 95523.05 | | |
| May | 11083.22 | 86683.73 | | |
| June | 10321.35 | 80262.61 | | |
| July | 10372.83 | 81275.52 | | |
| August | 11244.34 | 87493.17 | | |
| September | 10531.5 | 81892.04 | | |
| October | 12520.15 | 96287.71 | | |
| November | 11438.91 | 104404.23 | | |
| December | 13861.39 | 126578.16 | | |

FIG. 4

ARTIFICIAL INTELLIGENCE MICROGRID AND DISTRIBUTED ENERGY RESOURCES PLANNING PLATFORM

CROSS-REFERENCE TO RELATED APPLICATION

This application claims the benefit of priority from Provisional Patent Application No. 62/582,064, filed Nov. 6, 2017, for "Artificial Intelligence (AI) Microgrid and Distributed Energy Resources (DER) Planning Platform," the entire contents of which is incorporated herein by reference.

TECHNICAL FIELD

The subject matter of this application relates generally to cloud computing and computer information systems applications for energy generation and usage.

BACKGROUND

Microgrid and Distributed Energy Resources (DER) project development costs are high due to missing technical and geospatial information and limited computer power to analyze larger geographic regions of interest for investors, technology vendors, energy providers and regulatory authorities. There is no holistic online solution for analyzing buildings or geographic regions in a simple and fast manner. Various data is needed to assess the costs and environmental potential for certain buildings, building types, industries or geographic regions. This data includes but is not limited to: energy and energy demand data, tariff data, technology data, weather data (e.g., solar radiation or temperature) and any other suitable data. A conventional approach is to model each building individually and collect all the data that is needed. Typically, such a process can take weeks. Thus, such an approach is not viable for hundreds or thousands of projects, buildings or larger areas containing many different customers.

Microgrid and DER solutions often include a wide variety of technologies, including but not limited to: photovoltaics, electric storage, heat storage, cold storage, solar thermal, heat pumps (ground and air), electric vehicles, hydrogen and hydrogen storage, flow batteries, absorption and absorption chillers, centralized cooling and heating, internal combustion engines, gas turbines, micro-turbines, all kinds of fuel cells, combined heat and power, cooling technologies and any other suitable technologies.

Microgrid and DER solutions have multiple energy carriers as input, including but not limited to: natural gas, hydrogen, biogas, methane, diesel, biomass, sun, wind, hydro and any other suitable energy carriers.

Microgrid and DER solutions are efficiency measures (e.g., building upgrades, window changes) to reduce the overall energy demand for heating, cooling, electricity (e.g., lighting or computing, and any other suitable efficiency measures.

Microgrids and DER solutions are demand response measures to shift, reduce or cut power demand (e.g., electricity or heating).

To evaluate the attractiveness of a planning project in terms of annualized investment costs, net present value, internal rate of return, capital expenditure (CAPEX), operating expense (OPEX), efficiency, environmental impact as $CO_2$ emissions, NOx emissions or CO emissions, sophisticated mathematical models are needed. Such models can use simulation or optimization techniques. Such models need to combine the characteristics of the technologies (e.g., specific investment costs as $/kW or $/kWh, electrical and thermal efficiency, charging and discharging efficiencies, minimum state of the charge, maintenance costs) with load profiles (e.g., on an hourly or 1-15 min basis) for different end uses (e.g., electric, heating, domestic hot water, cooling, natural gas, process heat in the industry), energy prices, tariffs and environmental constraints (e.g. available space for photovoltaics). Based on available information and other assumptions and data (e.g., solar radiation or wind data), the simulation and/or optimization techniques calculate an optimal technology mix, costs, CAPEX, OPEX, and an environmental impact for the sites, places, buildings, or geographic regions under consideration.

The conventional data collection and modelling approach described above is burdensome and prohibits modeling parts of cities, counties, states, or whole countries. Moreover, investors, technology vendors, energy providers, regulatory authorities often look for methods to simulate and/or optimize large numbers of customers, buildings, areas, counties to receive guidance on their possible revenues, technology potentials, impact on service area, or regulatory issues.

Conventional solutions use "typical" building models, examples, or use cases in each geographic region with detailed input data to build a database for those buildings based on simulation and/or optimization techniques, and then use the database for other analyses. This approach, however, limits the results of the analyses to the specific parameters selected and there is no efficient way to scale the results to other combinations of input data, regions, change in energy consumption, tariffs and other assumptions which can change with each analysis.

SUMMARY

The embodiments disclosed herein are directed to an AI-enabled microgrid and DER planning platform that uses AI methods and takes into account cost calculations, emission calculations, technology investments and operation. In an embodiment, the computing platform is deployed on a network (cloud computing platform) that can be accessed by a variety of stakeholders (e.g., investors, technology vendors, energy providers, regulatory authorities). In an embodiment, the planning platform implements machine learning (e.g., neural networks) to estimate various planning parameters, where the neural networks are trained on observed data from real-world microgrid/minigrid and DER projects.

In an embodiment, a method comprises: receiving, by one or more processors, a first set of input planning parameters for a microgrid or distributed energy resources (DER) system; receiving, by the one or more processors, input data describing one or more facilities of the microgrid or DER system; generating, by the one or more processors, training data based on a formal method that uses a mathematical model; training, by the one or more processors, an artificial intelligence (AI) planning model using the training data; applying, by the one or more processors, the AI planning model to a second set of input planning parameters; and reporting, by the one or more processors, a planning solution for the second set of input planning parameters. The first or second set of input planning parameters can include at least one of hourly load profiles for each end use, energy provider data, natural gas costs, solar radiation data, hourly average outside temperatures or technology options.

In another embodiment, the AI planning model includes machine learning and the method further comprises: generating, by the one or more processors, indices for the input data; training, by the one or more processors, a machine learning model using the training data; and applying, by the one or more processors, the machine learning model to a second set of input planning parameters. The machine learning model can be a multilayer neural network. The indices can include but are not limited to: energy intensity for a building type as an indicator of an hourly load; geographic location as an indicator for solar radiation or hourly average outside temperature for a utility service area; customer type as an indicator for an energy provider or utility costs; and geographic location as an indicator for changed technology costs.

Other embodiments are directed to systems, apparatuses and non-transitory computer-readable mediums. For example, if enough implemented microgrid/minigrid and DER installations become available, then real observed project data can be used for the AI training instead of mathematical calculations.

Particular implementations disclosed herein provide one or more of the following advantages. The disclosed computing platform implements an AI-based planning tool for microgrids and DER systems that estimates or predicts possible revenues, technology potentials, electrical impact on a service area, and regulatory issues for various stakeholders, including but not limited to: investors, technology vendors, energy providers, regulatory authorities, large numbers of customers, building areas, industries and counties or countries.

The planning tool uses simulation and/or optimization techniques (e.g., mixed integer, linear, non-linear, stochastic approaches) for planning. In an embodiment, real observed project data sets are used to create training sets of buildings and areas that are used to train neural networks (e.g., train a multilayer convolutional neural network) to recognize various planning parameters, including but not limited to: annualized investment costs, net present value, internal rate of return, CAPEX, OPEX, efficiency, environmental impact as $CO_2$ emissions, NOx emissions or CO emissions for buildings, building types, campuses, microgrids/minigrids, and areas, including power flow issues based on approximated or real observed data.

The disclosed embodiments include a cloud based information Technology (IT) computing platform that addresses microgrid and DER planning projects involving many different buildings, building types, and larger geographic areas. The disclosed embodiments save time, costs, and computer power and allow fast analyses without collecting enormous amounts of data or incurring long computing times after the system has been trained. An advantage of the microgrid and DER planning tool is the use of self-learning databases and indices instead of detailed input data to minimize the data collection process for the user.

Investors can use the platform to assess the attractiveness of a project within minutes or seconds without the need of burdensome and time consuming data collection processes. Investors will be able to identify, for example, regions, areas, and building types, industries, as well as customers with a certain project rate of return, net present value, CAPEX, OPEX and this will allow them to target the most effective and attractive customers without a long pre-selection process.

Technology vendors can use the platform to assess the attractiveness of their technologies in combination with other technologies. This will allow them to better estimate their sales, revenues, and technology penetration and this will increase their financial planning capabilities. Technology vendors can assess the environmental impact (e.g., $CO_2$, NOx, CO Emissions among possibly others) for their technologies quickly, separated by the different customer segments (e.g., building types).

Energy providers (and/or utilities) can use the platform to assess the impact on their energy sales and electric grid/network very quickly. Energy providers (and/or utilities) can assess the impact on power flow and grid stability, influenced by the different DERs and microgrid projects, very quickly, without the need of supercomputing.

Regulatory authorities can use the platform to assess the benefits (e.g., network upgrade costs versus local energy markets) for society by enabling certain microgrid and DER technologies at certain customers, buildings, industries, and regions. Regulatory authorities can improve the capabilities to regulate energy providers/utilities by a better modelling and understanding of their costs inflicted by microgrid and DER projects. On the other hand, this also means that microgrid and DER projects can be placed strategically in a utility or energy provider network to avoid higher energy costs for the society.

The details of the disclosed implementations are set forth in the accompanying drawings and the description below. Other features, objects and advantages are apparent from the description, drawings and claims.

DESCRIPTION OF DRAWINGS

FIG. 3 is an example parameter matrix ($PM_i$), according to an embodiment.

FIG. 4 is an example result matrix ($RM_i$), according to an embodiment

DETAILED DESCRIPTION

Figure 1:
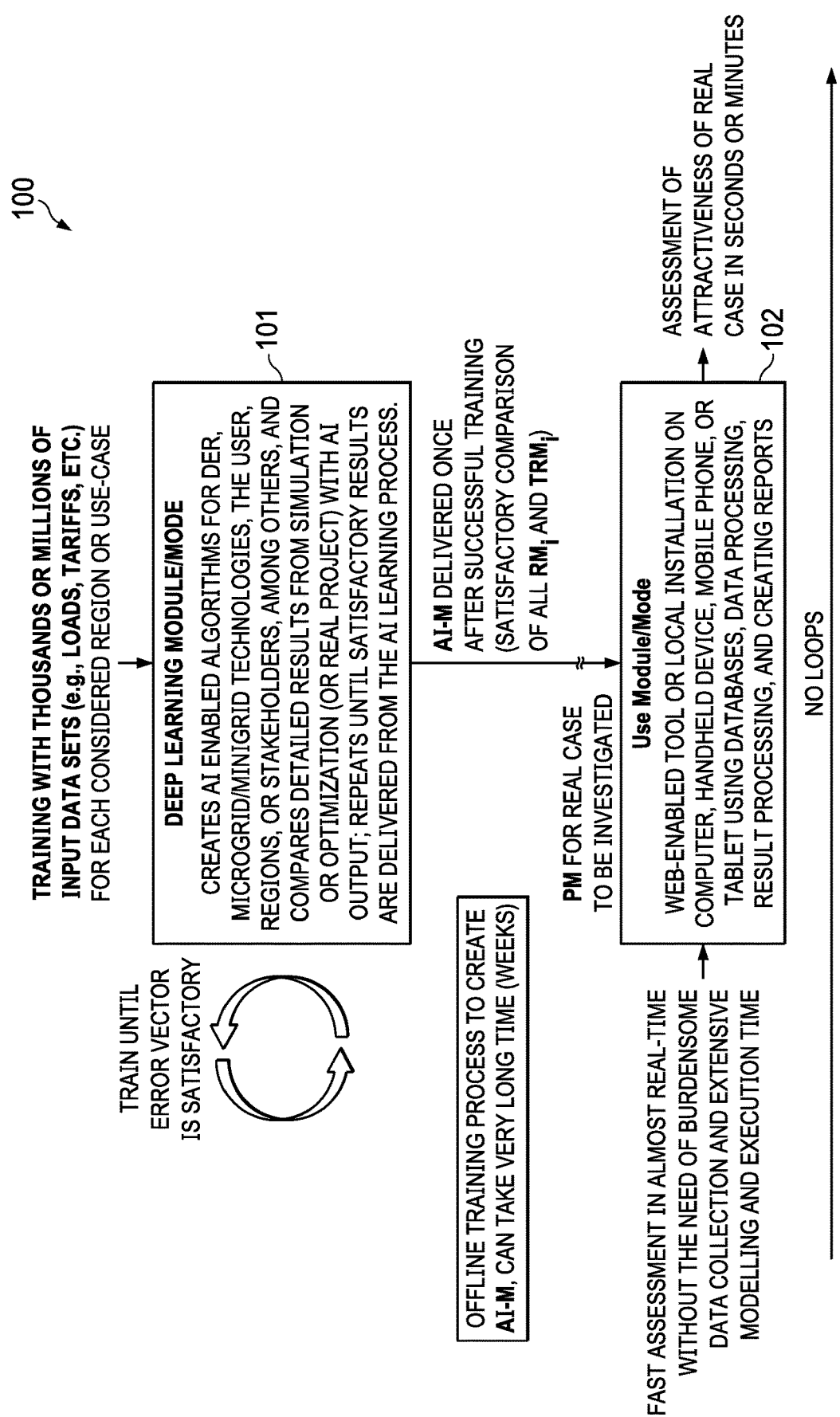
FIG. 1 is conceptual block diagram illustrating an AI-enabled microgrid and DER planning platform, according to an embodiment.

FIG. 1 is conceptual block diagram illustrating an AI-enabled microgrid (also referred to as "minigrid") and Distributed Energy Resources (DER) planning platform 100, according to an embodiment. In an embodiment, the AI-enabled microgrid and DER planning platform 100 includes two modules: deep learning module 101 and use module 102. Modules 101, 102 collectively comprise the platform 100 and are configured to estimate microgrid and DER planning parameters for a particular site, place, building, or geographic region under consideration by a stakeholder (hereinafter collectively referred to as a "facility"). The planning parameters include but are not limited to: technology mix, costs, CAPEX, OPEX and environmental impact. Platform 100 can be implemented using a cloud-based computing platform, where stakeholders access the platform through a network (e.g., the Internet) using a desktop computer or mobile device. The AI used by platform 100 can include one or more formal methods (e.g., one or more mathematical models) or one or more machine learning algorithms (e.g., one or more multilayer convolutional neural networks).

As used herein, a "power grid" is a network of power providers and consumers that are connected by transmission and distribution lines and operated by one or more control centers. As used herein a "microgrid" or "minigrid" is a group of interconnected loads and distributed energy resource (DER) systems within defined electrical boundaries that act as a single controllable entity with respect to the power grid. A microgrid/minigrid can connect and disconnect from the power grid to enable it to operate in both grid-connected or island-mode. As used herein, "DER" systems are small-scale power generation or storage technologies (typically in the range of 1 kW to 10,000 kW) used to provide an alternative to, or an enhancement of, a traditional power grid. A microgrid/minigrid can also include heat, cooling and other forms of energy delivery.

Example Processes

Figure 2:
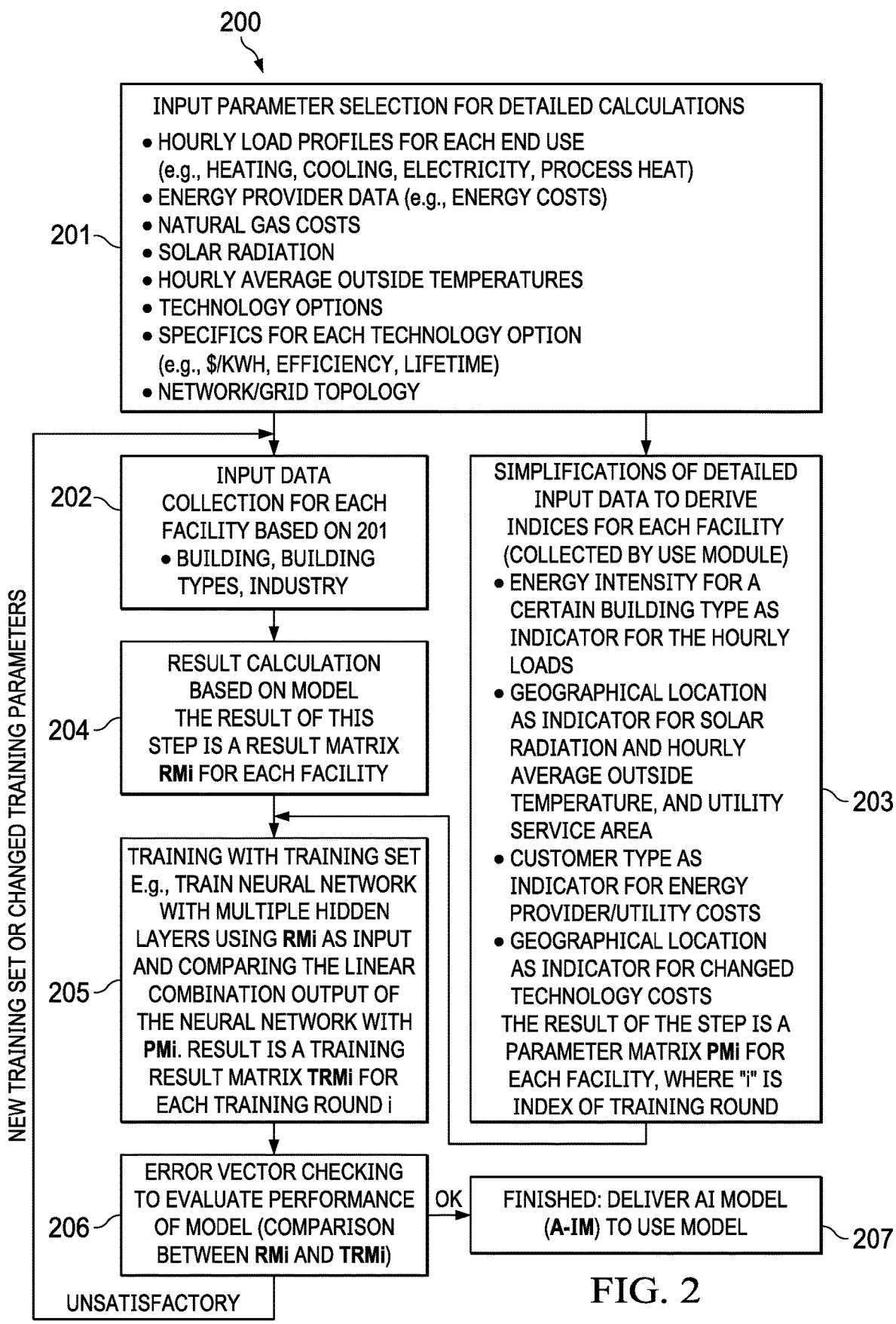
FIG. 2 is a flow diagram of a deep learning process performed by a deep learning module of the AI-enabled microgrid and DER planning platform of FIG. 1, according to an embodiment.

FIG. 2 is a flow diagram of a deep learning process performed by deep learning module 102 of the microgrid and DER planning platform 100 of FIG. 1, according to an embodiment.

Deep Learning Mode

Figure 6:
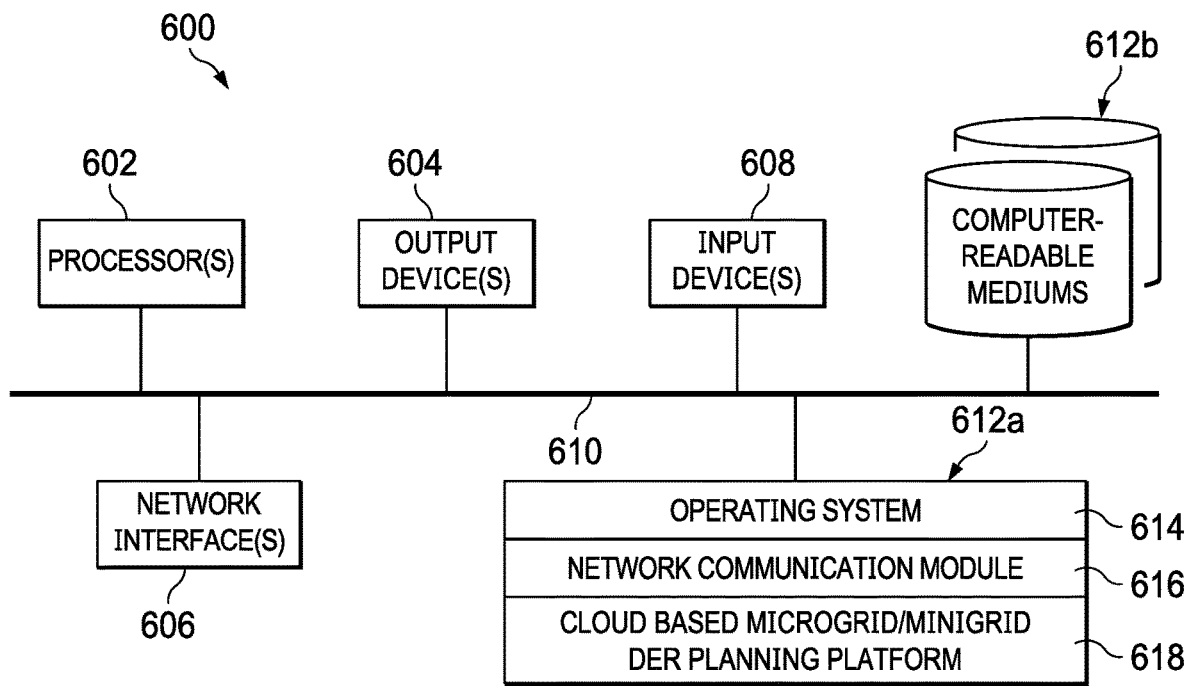
FIG. 6 is an example server computer architecture for implementing the features and processes described in reference to FIGS. 1-4.

In an embodiment, the deep learning module 101 implements process 200 using the computer architecture shown in FIG. 6. Process 200 begins by selecting input planning parameters (201), collecting input data for each facility of a microgrid/DER (202) and generating indices for use as training data for an AI model (203). The indices are used to simplify detailed input data for facilities, which can be easily collected by the user of the platform 100 using the use module 102. The result of the foregoing steps 201-203 is a Parameter Matrix ($PM_1$) for each facility (e.g., for each building, building type, industry), where the subscript "i" is the ith facility under consideration by a stakeholder (e.g., an investor, technology vendor, energy provider, regulatory authority).

The $PM_1$ contains indices describing the facilities and/or energy demands of the microgrid/DER, such as building type (e.g., new building or old building)," facility location (e.g., "Los Angeles" or "London") and energy demand (e.g., solar radiation). An example of $PM_i$ data is shown in FIG. 3 for a warehouse located in San Francisco that was built before 1980. The example $PM_1$ data includes tariff data, technology variable costs and a monthly breakdown of total electricity costs, total cooling costs, total combined electricity and cooling costs, peak electricity usage per week and per weekend.

Process 200 continues by calculating a result matrix $RM_i$ using an AI planning model (204). The AI planning model combines the characteristics of technologies (e.g., specific investment costs as $/kW or $/kWh, electrical and thermal efficiency, charging and discharging efficiencies, minimum state of the charge, maintenance costs) with load profiles (e.g., on an hourly or 1-15 min basis) for different end uses (e.g., electric, heating, domestic hot water, cooling, natural gas, process heat in the industry), energy prices, tariffs and environmental constraints (e.g. available space for photovoltaics).

In an alternative embodiment, the model is based on real planning project data rather than a model. The result of step (204) is the result Matrix ($RM_i$) for each building, building type, industry, etc. An example $RM_1$ is shown in FIG. 4 for the warehouse located in San Francisco that was built before 1980. The $RM_i$ data can include but is not limited to: annual energy costs, annual CO2 emissions, total electric costs, total electricity costs and total annual electricity purchase. Also shown in FIG. 4 is a technology mix example (e.g., photovoltaic, stationary battery) and breakdown of total monthly electricity costs and electricity purchases for the warehouse.

Process 200 continues by training the machine learning model (e.g., a multilayer convolutional neural network, forward neural network) (205) using the $RM_i$ and $PM_i$ as a training set. The result of the training is a Training Results Matrix $TRM_i$. In an embodiment, process 200 preforms error vector checking (206) to evaluate the performance of the machine learning algorithm. For example, an error vector can be generated by comparing the $RM_i$ with the $TRM_i$ (e.g., computing the difference). If the machine learning model performance does not satisfy a specified performance criteria, then an additional training set is selected and the training repeats. If the machine learning model performance is satisfactory, the resulting AI-M is made available to the use module (207). In an embodiment, whether or not the AI performance is satisfactory is evaluated based on a comparison of the error vector with a threshold value.

In an embodiment, the trained AI-M has the same data format as the $PM_i$, including simplified data points needed to process input data in the use module 102, and a mathematical description of the trained machine learning model, including but not limited to: weights for the different nodes in the machine learning model, the number of layers in the machine learning model, and the link structure of the nodes. If machine learning methods (e.g., neural networks) are used, the model description needs to be complete so that it can be built and replicated in the use module 102. The data format and simplified data (indices) need to follow the specifications from step 203 of the deep learning process 200. The reduction of planning data complexity to simple indices in $PM_i$ is advantageous in that the indices reduce computing times considerably and increase usability of the AI-enabled planning platform 100.

In an embodiment, a training set for the deep learning process 200 includes the calculated indices $PM_1$, and the detailed results $RM_i$ from the simulation or optimization for each training building, building type, industry, or geographic region. Instead of using simulated data, real data from a completed microgrid/DER planning project can be used as the $RM_i$ in the deep learning module 101. In this circumstance, step 204 is not needed and the $RM_i$ includes the real planning project data.

Use Module

Figure 5:
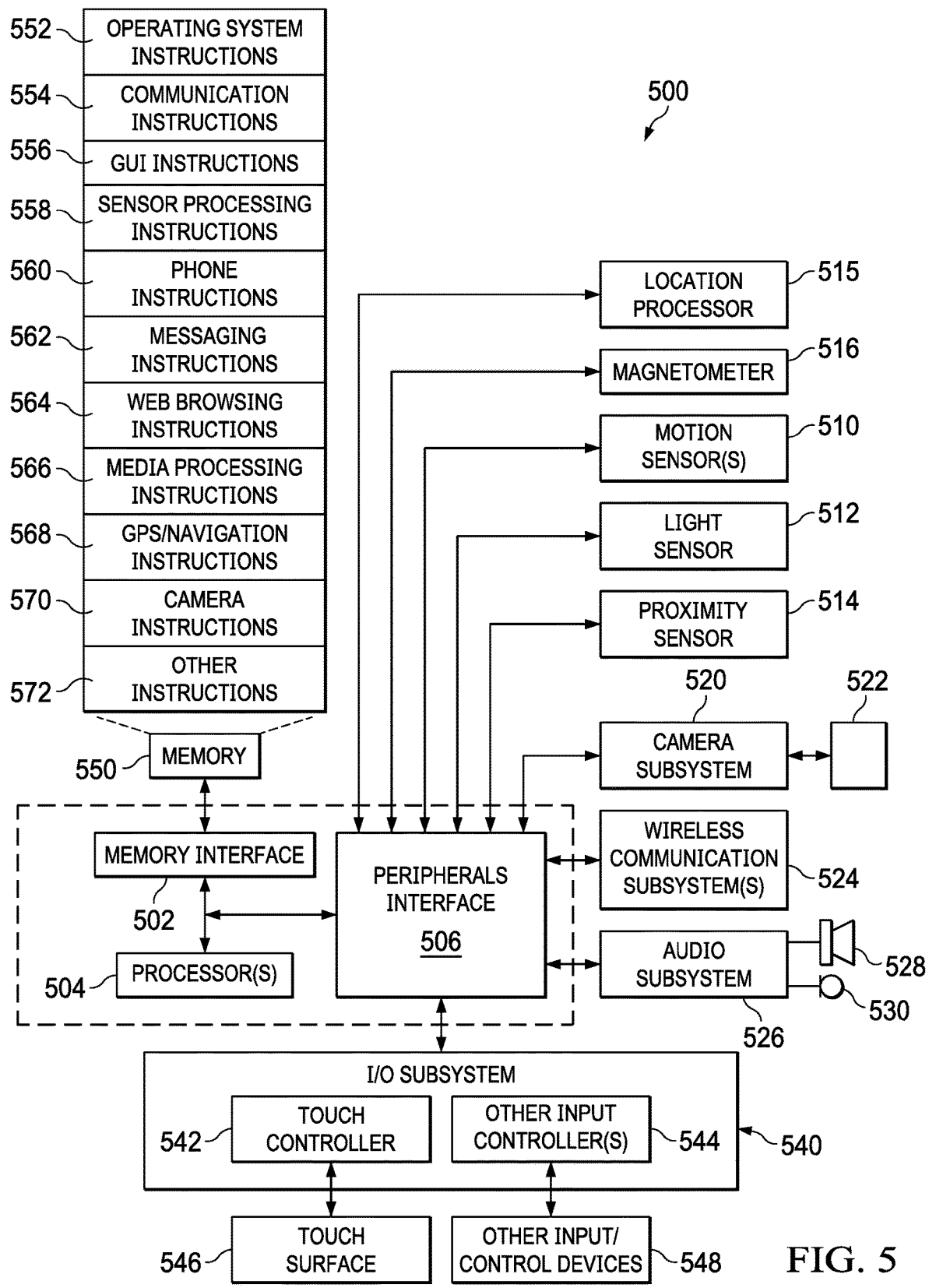
FIG. 5 is an example mobile device architecture for implementing the features and processes described in reference to FIGS. 1-4.

The use module 102 performs the following: (a) collects indices for the individual building, customer, industry, or area of interest based on the same data format as the $PM_i$, an example of which is shown in FIG. 3; (b) uses the collected indices to run the trained AI-M on the planning platform 100; and (c) calculates output for planning parameters, including but not limited to: annualized investment costs, net present value, internal rate of return, CAPEX, OPEX, efficiency, environmental impact as $CO_2$ emissions, NOx emissions or CO emissions for the considered building, building type, campus, Microgrid, and/or area of interest. The use module 102 can be implemented as a web-based tool or run locally on any computer, handheld device, mobile phone, or tablet. An example mobile device architecture for implementing the use module 102 is shown in FIG. 5. In an embodiment, the use module 102 uses one or more databases to reduce the user's labor and time by providing locational input data or tariff data and any other appropriate data. The use module 102 also produces reports for the user.

Example Client Architecture

FIG. 5 is a block diagram of example mobile device architecture 500 for implementing the features and processes described in reference to FIGS. 1-4. Architecture 500 may be implemented in any mobile device for implementing the features and processes described in reference to FIGS. 1-4, including but not limited to portable computers, smart phones and tablet computers, game consoles, wearable computers and the like. Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyros) may be utilized to detect movement and orientation of the device. Accordingly, display objects or media may be presented according to a detected orientation (e.g., portrait or landscape). Other sensors may also be connected to peripherals interface 506, such as a temperature sensor, a biometric sensor, or other sensing device, to facilitate related functionalities.

Location processor 515 (e.g., GPS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used with an electronic compass application.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication systems 524 may include a port, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate using known or standardized protocols, including but not limited to: global system for mobile communications (GSM), GPRS, enhanced data GSM environment (EDGE), IEEE 802.x (e.g., Wi-Fi, Wi-Max), code division multiple access (CDMA), Near Field Communications (NFC), Bluetooth® (including classic Bluetooth® and Bluetooth® low energy (BLE)). Wireless communication subsystems 524 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known or standardized protocol.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, architecture 500 may present recorded audio and/or video files, such as MP3, AAC, and MPEG video files. In some implementations, architecture 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications, as described in reference to FIGS. 1-4. Communication instructions 554 may also be used to select an operational mode or communication medium for use by the device, based on a geographic location (obtained by the GPS/Navigation instructions 568) of the device. Memory 550 may include graphical user interface instructions 556 to facilitate graphical user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for performing some or all of the processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

Example Server Architecture

FIG. 6 is a block diagram of example server computer system architecture 600 for implementing the features and processes described in reference to FIGS. 1-4. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more non-transitory computer-readable mediums 612b and memory 612a (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "non-transitory computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 612b or memory 612a can further include operating system 614 (e.g., Mac OS® server, Windows® NT server), network communication module 616 and dynamic content presentation module 618. Operating system 614 can be multi-user, multiprocessing, multitasking, multithreading, real time, etc. Operating system 614 performs basic tasks, including but not limited to: recognizing input from and providing output to devices 604; keeping track and managing files and directories on storage devices 612b and memory 612a; controlling peripheral devices; and managing traffic on the one or more communication channels 610. Network communications module 616 includes various components for establishing and maintaining network connections (e.g., software for implementing communication protocols, such as TCP/IP, HTTP, etc.). Dynamic content presentation module 618 provides the features and performs the process, described in reference to FIGS. 1-17.

Architecture 600 can be included in any computer device, including one or more server computers each having one or more processing cores. Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:
   receiving, by one or more processors, input data describing one or more facilities of a microgrid or distributed energy resources (DER) system;
   generating, by the one or more processors, indices for the input data;
   training, by the one or more processors, a machine model using the indices;
   applying, by the one or more processors, the machine learning model to a set of input planning parameters; and
   reporting, by the one or more processors, a planning solution for the set of input planning parameters.

2. The method of claim 1, wherein the machine learning model is a multilayer neural network.

3. The method of claim 1, wherein the indices include energy intensity for a building type as an indicator of an hourly load.

4. The method of claim 1, wherein the indices include geographic location as an indicator for solar radiation or hourly average outside temperature for a utility service area.

5. The method of claim 1, wherein the indices include customer type as an indicator for an energy provider or utility costs.

6. The method of claim 1, wherein the indices include geographic location as an indicator for changed technology costs.

7. The method of claim 1, wherein the set of input planning parameters includes at least one of hourly load profiles for each end use, energy provider data, natural gas costs, solar radiation data, hourly average outside temperatures or technology options.

8. A system comprising:
   one or more processors;
   memory storing instructions that when executed by the one or more processors, cause the one or more processors to perform operations comprising:
      receiving input data describing one or more facilities of a microgrid or distributed energy resources (DER) system;
      generating indices for the input data;
      training a machine learning model using the indices; and
      applying the machine learning model to a set of input planning parameters; and
      reporting a planning solution for the set of input planning parameters.

9. The system of claim 8, wherein the machine learning model is a multilayer neural network.

10. The system of claim 8, wherein the indices include energy intensity for a building type as an indicator of an hourly load.

11. The system of claim 8, wherein the indices include geographic location as an indicator for solar radiation or hourly average outside temperature for a utility service area.

12. The system of claim 8, wherein the indices include customer type as an indicator for an energy provider or utility costs.

13. The system of claim 8, wherein the indices include geographic location as an indicator for changed technology costs.

14. The system of claim 8, wherein the set of input planning parameters includes at least one of hourly load profiles for each end use, energy provider data, natural gas costs, solar radiation data, hourly average outside temperatures or technology options.

15. A non-transitory, computer-readable storage medium having instructions stored thereon, that when executed by one or more processors, cause the one or more processors to perform operations comprising:
   receiving input data describing one or more facilities of a microgrid or distributed energy resources (DER) system;
   generating indices for the input data;
   training a machine learning model using the indices;
   applying the machine learning model to a set of input planning parameters; and
   reporting a planning solution for the set of input planning parameters.

16. The non-transitory, computer-readable storage medium of claim 15, wherein the machine learning model is a multilayer neural network.

17. The non-transitory, computer-readable storage medium of claim 15, wherein the indices include energy intensity for a building type as an indicator of an hourly load.

18. The non-transitory, computer-readable storage medium of claim 15, wherein the indices include geographic location as an indicator for solar radiation or hourly average outside temperature for a utility service area.

19. The non-transitory, computer-readable storage medium of claim 15, wherein the indices include customer type as an indicator for an energy provider or utility costs.

20. The non-transitory, computer-readable storage medium of claim 15, wherein the indices include geographic location as an indicator for changed technology costs.

* * * * *

UNITED STATES PATENT AND TRADEMARK OFFICE
CERTIFICATE OF CORRECTION

PATENT NO. : 11,816,540 B2
APPLICATION NO. : 16/182495
DATED : November 14, 2023
INVENTOR(S) : Michael Stadler, Adib Nasle and Scott K. Mitchell It is certified that error appears in the above-identified patent and that said Letters Patent is hereby corrected as shown below:

In the Claims

Column 12, Claim 1, Line 16, after "machine" insert -- learning --

Signed and Sealed this
Twenty-first Day of May, 2024

Katherine Kelly Vidal
*Director of the United States Patent and Trademark Office*